(12) United States Patent
Stimpson (10) Patent No.: US 6,596,949 B2
(45) Date of Patent: Jul. 22, 2003

(54) TANK WEIGHING ASSEMBLY WITH INTEGRATED TANK MOUNT AND LOAD CELL

(76) Inventor: Jon L. Stimpson, 690 Discovery Dr., Huntsville, AL (US) 35806

( * ) Notice: Subject to any disclaimer, the term of this patent is extended or adjusted under 35 U.S.C. 154(b) by 70 days.

(21) Appl. No.: 09/947,555

(22) Filed: Sep. 6, 2001

(65) Prior Publication Data

US 2003/0042050 A1 Mar. 6, 2003

(51) Int. Cl.[7] .................. G01G 19/52; G01L 1/04
(52) U.S. Cl. .................. 177/142; 177/184; 177/211; 177/DIG. 9; 73/862.632; 73/862.635
(58) Field of Search .................. 177/142, 184, 177/210 R, 211, DIG. 9; 73/862.634, 862.641, 862.642, 862.635, 862.632, 862.637

(56) References Cited

U.S. PATENT DOCUMENTS 3,960,013 A * 6/1976 Ormond ............ 177/211
3,980,148 A * 9/1976 Von Drygalski ............ 177/132
4,044,920 A * 8/1977 Swartzendruber ............ 177/211
4,258,810 A * 3/1981 Susor ............ 177/134
4,411,325 A * 10/1983 Hamilton ............ 177/211
5,313,022 A * 5/1994 Piroozmandi et al. ............ 177/211
5,801,339 A * 9/1998 Boult ............ 177/261
6,005,199 A * 12/1999 Harada et al. ............ 177/211
6,150,619 A * 11/2000 Borngasser ............ 177/201

* cited by examiner

Primary Examiner—Randy Gibson
(74) Attorney, Agent, or Firm—Joseph H. Beumer (57) ABSTRACT

A tank weighing assembly includes a shear-web load cell in the form of an annular disk, a supporting base plate and components for mounting the load cell in a manner such as to enable compensation for effects of exposure to forces of the wind and thermal expansion. The load cell and a mounting washer each have an axial aperture through which a connecting bolt extends. The bolt has a countersunk head inclined at an angle of 45 to 50 degrees and an adjacent wall has an angle 3 degrees larger. A gap of ⅛th inch on each side of the bolt is provided to allow a small amount of lateral movement. Mating arcuate surfaces at the bottom of the load cell hub and at the top of the mounting washer enable self alignment.

9 Claims, 8 Drawing Sheets

TANK WEIGHING ASSEMBLY WITH INTEGRATED TANK MOUNT AND LOAD CELL

FIELD OF THE INVENTION

This invention relates to equipment for weighing heavy loads and more particularly to tank weighing assemblies using load cells.

BACKGROUND OF THE INVENTION

Various configurations of load cells and mounting hardware have been used in weighing assemblies for tanks. In one type of assembly a shear web load cell having an outer rim portion and a central hub portion, with those portions being connected by a thinner web portion, is placed to receive weight forces from a supported tank onto an upper surface of the outer rim, these forces being transmitted to a lower surface of the hub and from there to a supporting base, resulting in a deflection of the web as a function of tank weight. Measurements of weight values are obtained by use of strain gauges and associated circuitry.

Special problems are presented for outdoor tanks exposed to thermal expansion and wind forces. If the load cell is rigidly secured to a tank and to a supporting base, movements caused by these forces will result in false readings or toppling. Compensation for such movements is therefore required to obtain accurate results and prevent toppling.

Previously used mounting hardware for tank weighing assemblies has shown certain disadvantages. In some approaches a high precision parallel alignment of supporting legs of the tank and load cell connections has been required to obtain accurate results, and such alignment has proven difficult and expensive. Other approaches require use of cumbersome and heavy metal blocks, making installation procedures more difficult.

It is desired to provide a load cell tank weighing assembly in which the load cell and mount hardware are combined in an integrated unit of simple construction, the assembly enabling self-alignment and compensation for thermal and wind effects. A minimum height of the assembly is an additional desirable feature, along with protection from uplift forces due to wind.

SUMMARY OF THE INVENTION

The present invention is directed to a tank weighing assembly comprising a shear web load cell in the form of an annular disk, a supporting base plate, the bottom of the load cell and the top of the base plate having mating arcuate surfaces located at a central interface of these components and an axially extending connecting bolt having required dimensional and angular relationships with a wall of an aperture through which the bolt extends.

A concave arcuate surface may be provided at the bottom side of the load cell hub, this surface being adapted to receive a mating convex arcuate surface at the top of a supporting base plate. An axial aperture extends through each of the mating surfaces and into the base plate so that a connecting bolt may be inserted therein.

The connecting bolt has a countersunk head including an inclined lower portion tapering outward from the bolt circumference and defining a first angle with respect to vertical and an upper portion extending straight upward to the top of the bolt so as to avoid the presence of a sharp edge at the top. An aperture for receiving the bolt is provided at the axis of the load cell hub, the aperture having a first vertical portion shaped to receive the entire bolt head with slack remaining, a second, middle portion inclined to correspond to the first angle presented by the lower portion of the bolt head except for a required angular difference, preferably three degrees, and a third straight lower portion below the end of the first portion. The third straight portion of the aperture is sized to provide a substantial gap such as a total of ¼ inch between the wall and the bolt circumference, thus allowing space for compensatory lateral involvement of the load cell.

The domed portion of the base plate, or washer-like upward projecting member, has a straight aperture similar to the third portion of the load cell but of slightly reduced diameter. The body of the base plate has a threaded aperture for receiving a threaded end portion of the bolt.

Load cells for use in this invention take the form of a hermetically sealed annular disk including a central hub portion and an outer rim portion connected by radially extending arms which are substantially thinner than the rim and central portions.

In operation, supporting legs, or a plate to which the legs are attached, bear down on the top surface of the outer ring of the load cell, and an upper surface of the base plate bears upward against a bottom surface of a central hub portion of the load cell. This causes the web to be deformed under the applied load to an extent proportional to the weight of the tank and its contents. Strain gauges mounted at appropriate locations are used to measure slight differences in impedence or resistance which occur when the web is deflected. Signals obtained from the strain gauges are then processed to provide weight values.

The upward projecting convex arcuate surface at the top of the base plate coupled with a concave receiving pocket at the bottom of the load cell provide a self-aligning connection which does not require precise parallel alignment of tank legs and related hardware.

Gaps provided between the bolt and its countersunk head and an adjacent wall of an aperture allow lateral movement of the load cell resulting from thermal expansion. The gap between straight portions of the bolt and the wall may extend for a distance of ⅛ inch on each side, for a total distance of ¼ inch. Inclined portions of the countersunk bolt head and aperture wall may have an angular difference of three degrees from one another and angular values such as 45 to 50 degrees from vertical.

A lowermost portion of the connecting bolt may be fixedly secured to the base plate by means such as tightening of threads. This restricts upward movement of the load cell to the small gap between the inclined bolt head and the adjacent inclined wall. Uplift forces as might be produced by a strong wind are thus controlled.

Tank weighing assemblies embodying the invention provide several distinct advantages. The overall height of this device is lower than for prior mounts, providing more stability. A high degree of accuracy is obtained by the shear web design, and the integrated load cell/tank mount is easier to install and less expensive to manufacture.

It is therefore, an object of this invention to provide a integrated tank weighing assembly including a load cell and mount hardware.

Another object is to provide such an assembly which enables compensation for tank movements due to thermal effects and wind forces.

Yet another object is to provide a tank weighing assembly that is inexpensive to manufacture and install.

DESCRIPTION OF THE PREFERRED EMBODIMENT

Figure 1:
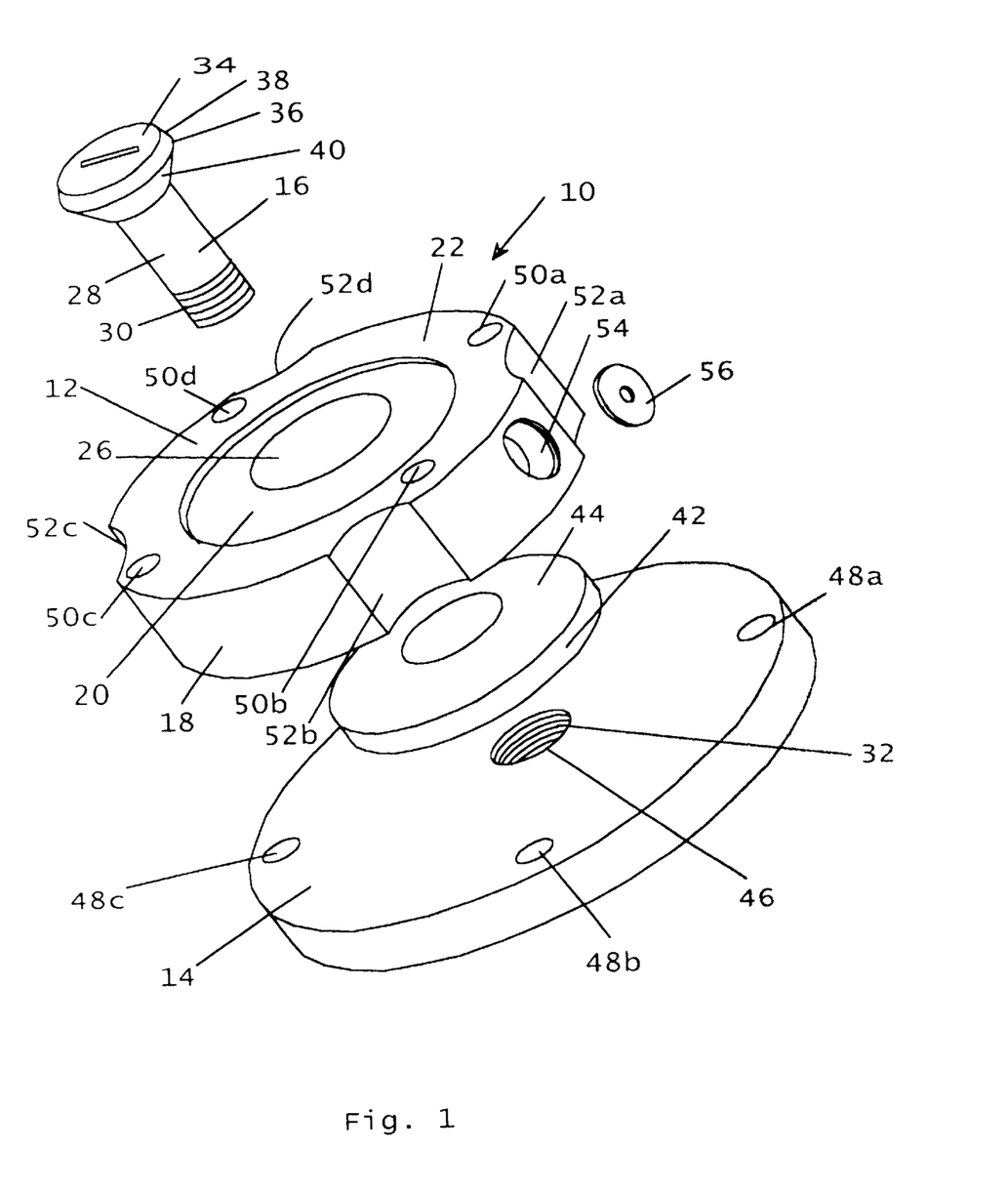
FIG. 1 is an exploded view showing major components of an integrated tank weighing assembly.
Figure 3:
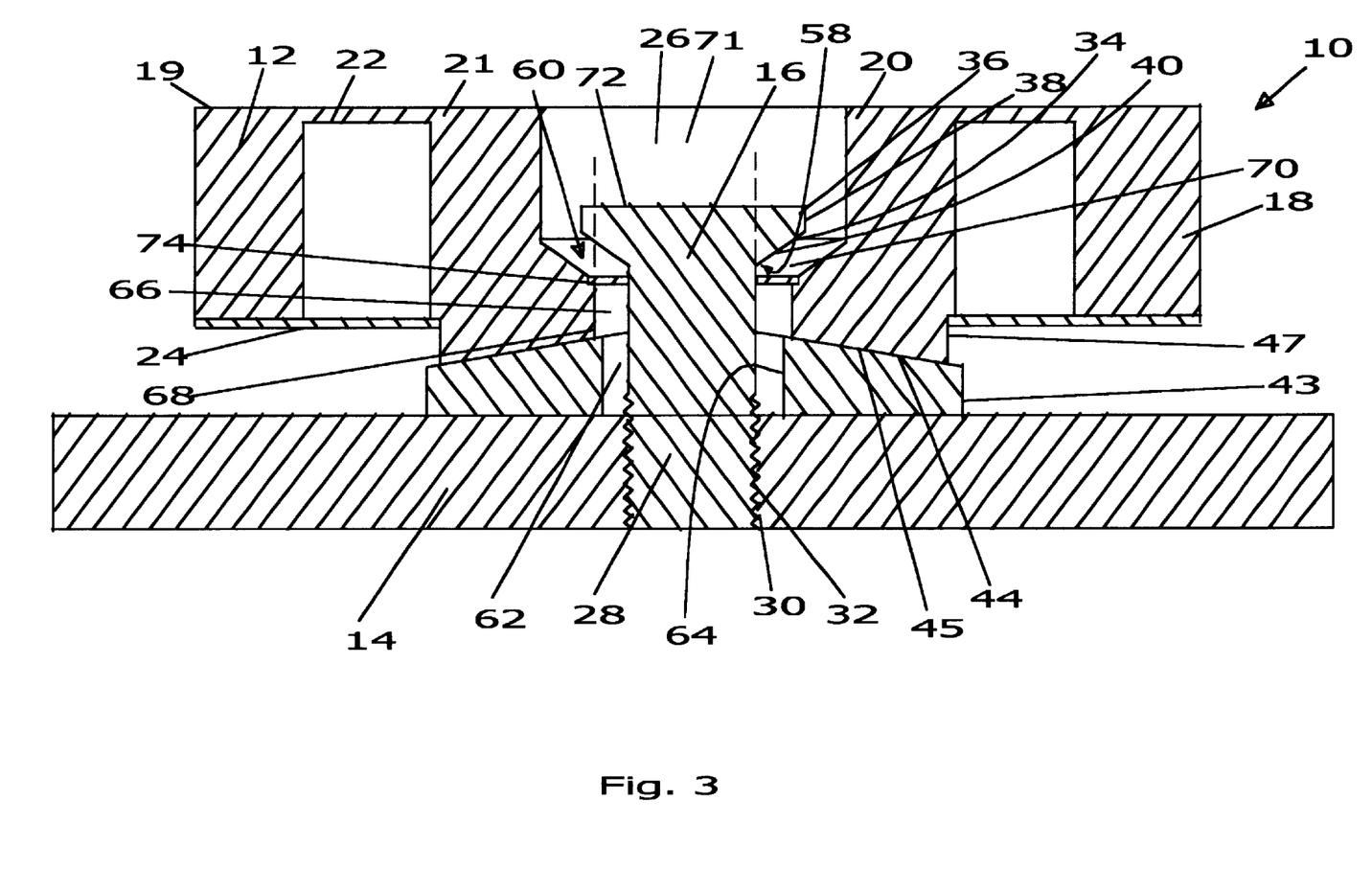
FIG. 3 is a sectional view taken across the center of the assembly of FIG. 1 and between arms of the web.

Referring to FIG. 1 of the drawings there are shown components of a tank weighing assembly 10 aligned for connection. The components include a load cell 12, a circular base plate 14 and a connecting bolt 16. The load cell is in the form of an annular disk having an outer ring 18 and a central hub portion 20 connected by arms of a web and hermetically sealed by an upper circular plate 22 and a lower plate 24 (FIG. 3). An aperture 26 having prescribed dimensions and angular characteristics extends axially through the load cell, providing for passage of the bolt.

Connecting bolt 16 has a lower cylindrical portion 28 provided with male threads 30 for engaging female threads 32 of base plate aperture 46. The bolt has a countersunk head 34 having a upper portion 36 with a short vertical region where surface 38 is aligned parallel to the axis of the bolt. Inclined region 40 below the upper region extends downward and inward to the top of cylindrical portion 28, with surface 42 of this region being inclined at a prescribed angle as described elsewhere.

Base plate 14 has an upward projecting central protrusion 42 with an arcuate convex surface 44 of truncated spherical shape adapted for engagement with a mating concave arcuate surface 45 defined in the lower side of hub 20 (FIG. 3). Protrusion 43 may be provided in the form of a washer having a flat bottom surface and a machined convex upper surface 44 which comes into contact with concave surface 45 defined in projecting portion 47 of hub 20. Apertures 48a, 48b, 48c and 48d (FIG. 1) are provided at locations around the circumference of the base plate to receive bolts for attachment to a platform such as a concrete pad (not shown). Load cell 12 has apertures 50a, 50b, 50c and 50d for receiving bolts securing feet of tank legs or a plate connected thereto (not shown) to the outer ring 18. The load cell may also have indentations 52a, 52b, 52c and 52d parallel to the bolt and located around the periphery of the load cell to enable tool access to heads of bolts disposed in apertures 48a, 48b, 48c, and 48d. Passage of electrical wires (not shown) into the load cell is enabled by port 54 in which plug 56 is inserted.

FIG. 3 shows the integrated load cell and tank mount in assembled condition. Bolt 16 is rigidly secured to base plate 14 by a threaded connection and is located within apertures in the load cell hub 20 and in the convex washer protrusion 43, which apertures have a larger diameter than the bolt so as to allow slight lateral movement of the load cell. Bolt 16 has a countersunk head 34 with a short upper portion 36 extending straight downward and an inclined portion 40 adjoining lower portion 28. Removal of an outer portion at the top of the bolt head is carried out to avoid damage which might result from the presence of a sharp edge. Inclined portion 40 may have an angle 58 such as 45 to 50 degrees from vertical. Central aperture 26 inside hub 20 of the load cell has a shape and dimensions generally corresponding to the various portions of the bolt, with a gap of prescribed size provided between the bolt and wall at each portion and with angles of adjacent inclined portions of the bolt and adjacent wall differing from one another to a prescribed extent. A difference of 2 to 5, and preferably three degrees, between the two inclined portions may be used, with the larger angle provided on the wall. Thus if angle 58 is set at 50 degrees, angle 60 of the adjacent wall would be 53 degrees.

Gap 62 between bolt 16 and aperture wall 64 of protrusion 42 may have a value of ⅛ inch on each side for a total of ¼ inch, which enables compensatory lateral movement. Gap 66 between wall 68 of hub 20 and the straight side portion of bolt 16 and gap 70 between the two angled surfaces may have a larger size such as ⅜ inch to allow sufficient lateral movement. Wide upper portion 71 of aperture 26 is preferably made deep enough that the top surface 72 of bolt 16 is located ½ inch below the top of plate 22. Arcuate surfaces 44 and 45 may have a truncated spherical shape machined to an eight inch radius.

In the embodiment described above, the bolt may have a diameter of ¾ inch with the other components sized to provide an overall height of slightly over 2½ inches, this assembly being designed for a weight capacity of 25,000 to 50,000 pounds. Higher capacity assemblies would require larger load cells and components, but the same bolt and mounting structure may be employed. To obtain favorable strength and corrosion resistance use of stainless steel metal components is preferred.

An 0 ring 74 is located at the upper edge of aperture wall 68 to provide a pad to cushion movements of the hub against the bolt, which could otherwise result in misalignment during installation.

Figure 2:
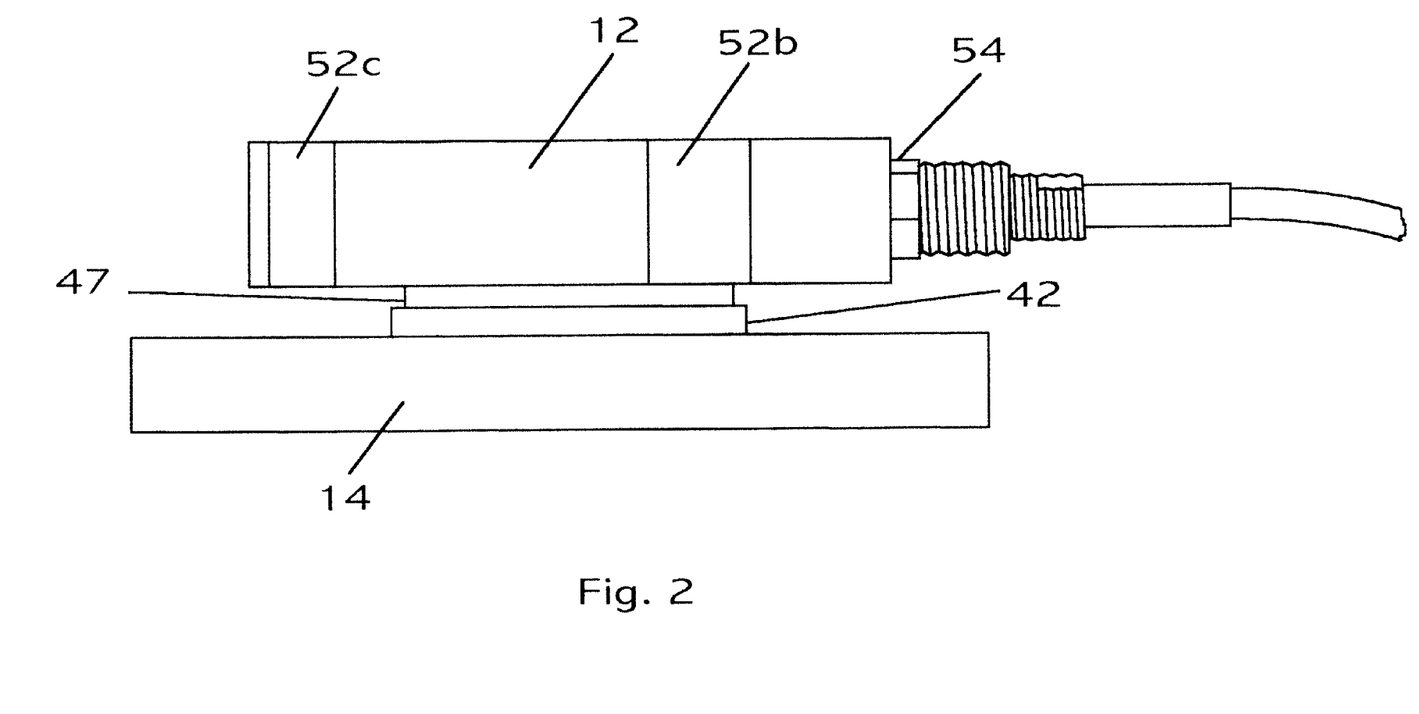
FIG. 2 is a side view of the integrated assembly.
Figure 4:
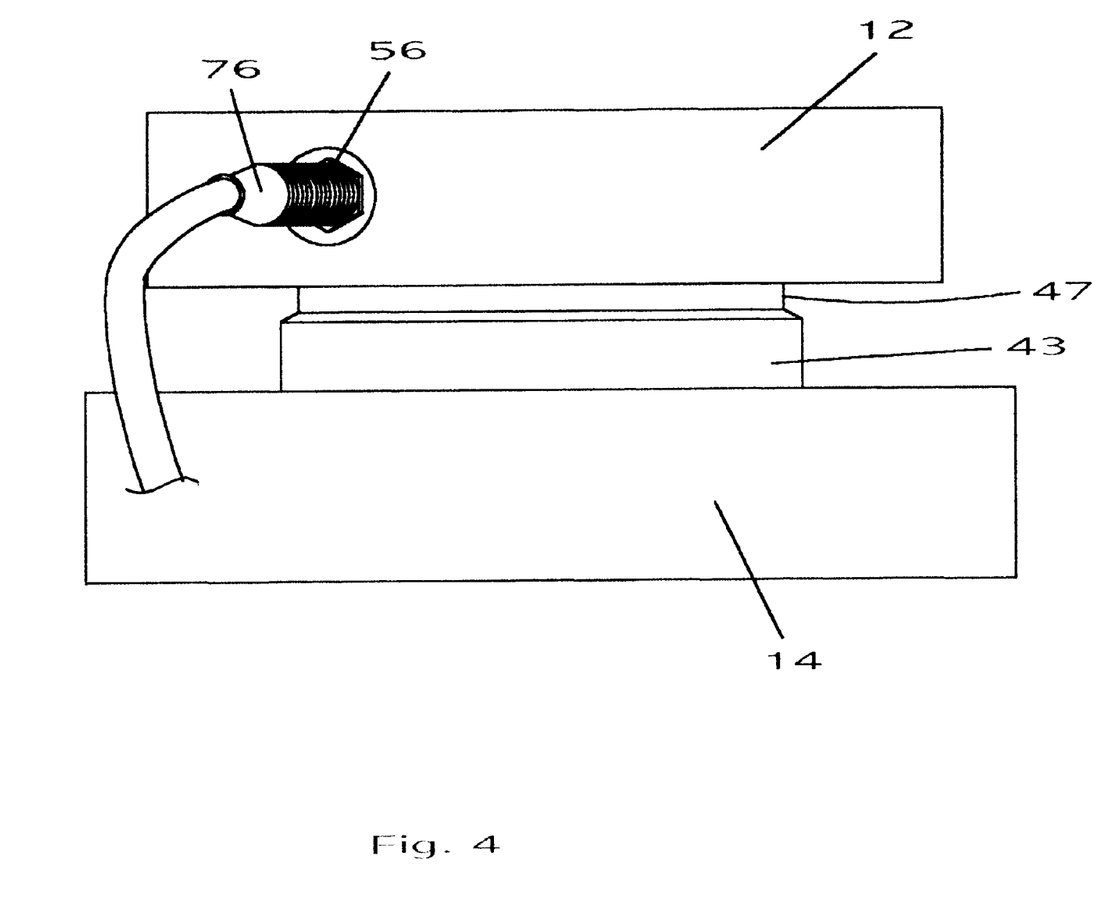
FIG. 4 is a side view of another embodiment, designed for heavier loads.
Figure 5:
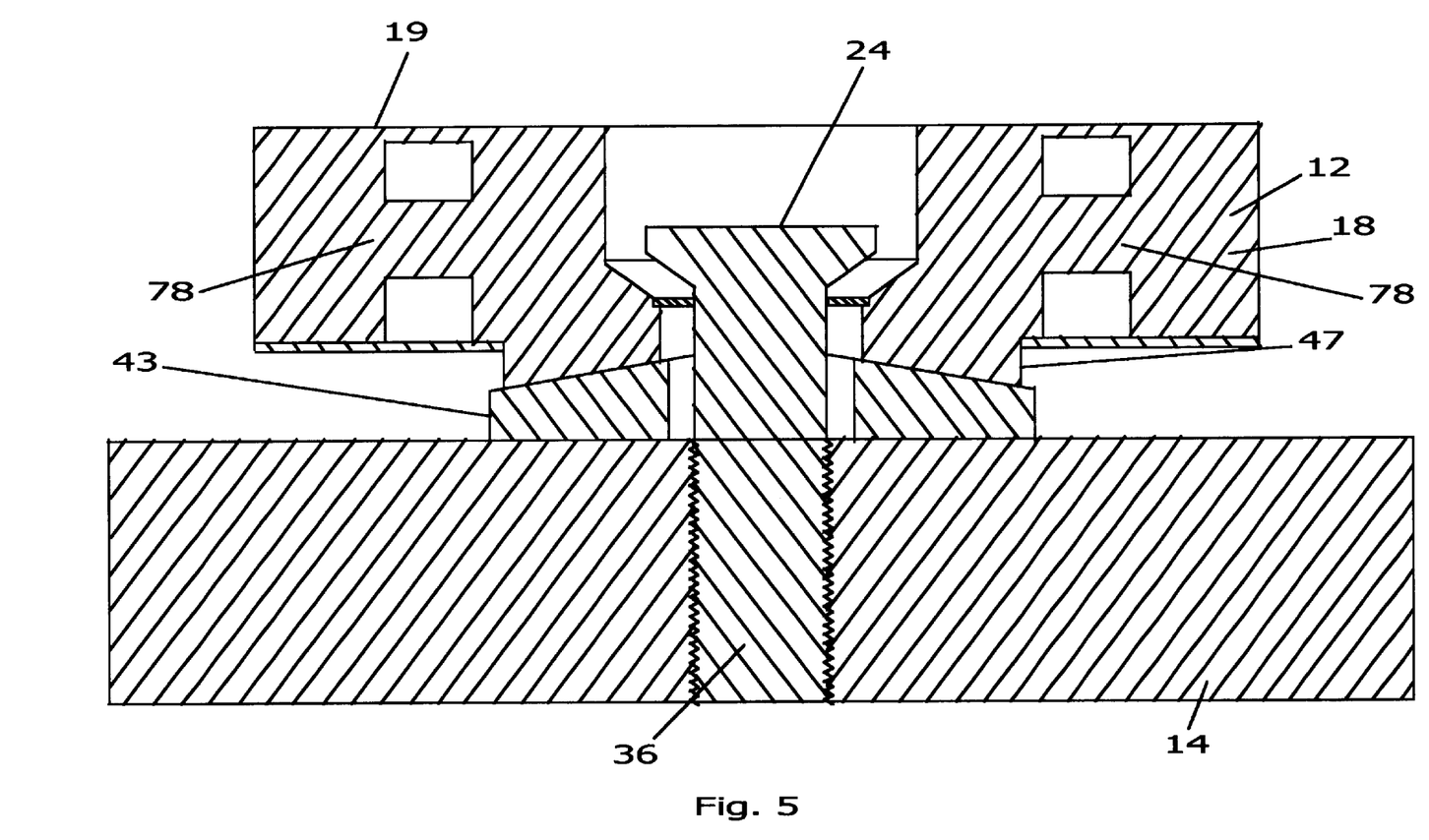
FIG. 5 is a sectional view of the assembly of FIG. 4 taken through arms of the web.

FIGS. 4 and 5 show an embodiment similar to the one shown in FIGS. 1–3 but enlarged in certain respects and designed for use at much heavier tank loads such as 150,000 to 225,000 pounds. The overall height of this assembly is increased to 4-¾ inches, the base plate having a thickness of two inches and the load cell 1.70 inches. Structure and dimensions of the bolt head and adjacent elements required for effective operation remain the same. FIG. 5 shows the location of arms 78 of the web structure not shown in other views.

Figure 6:
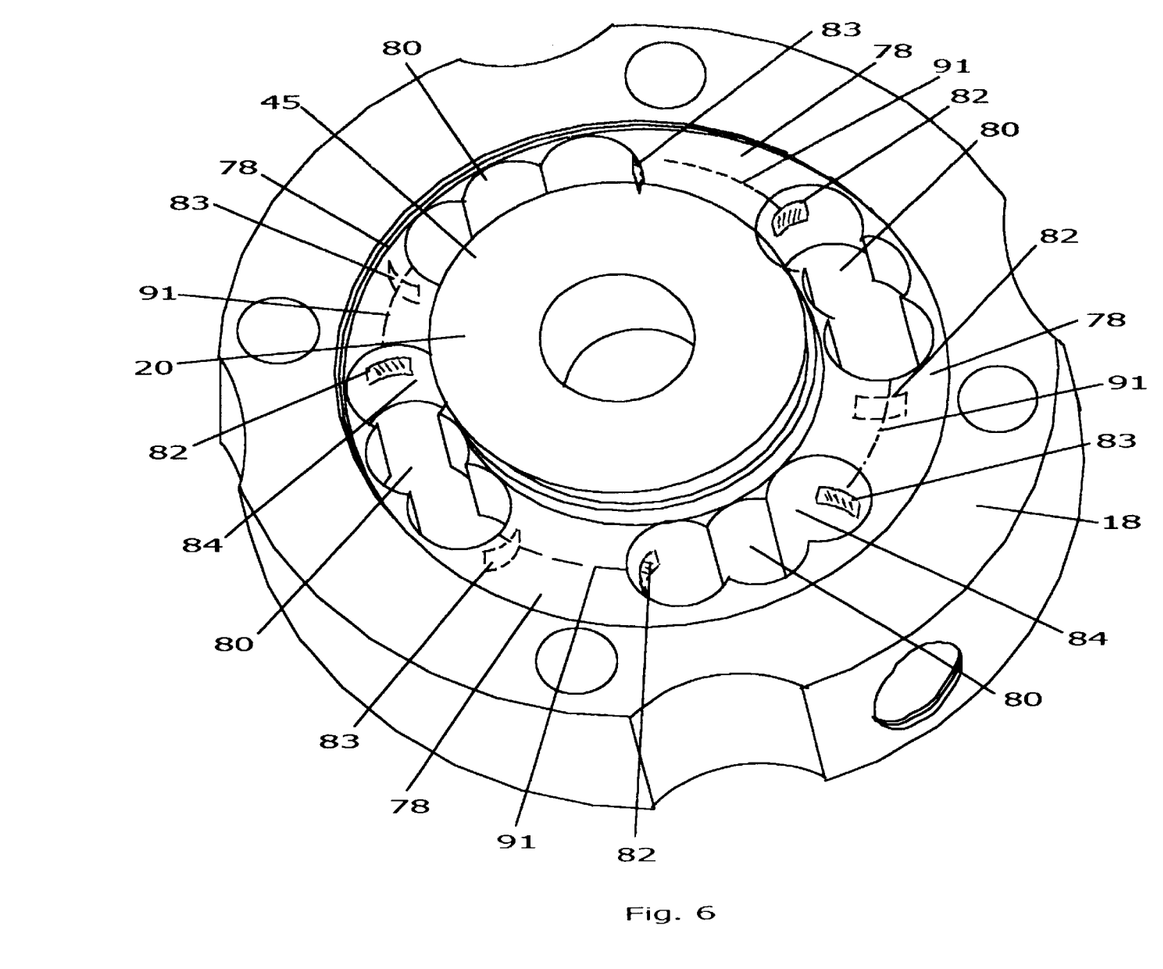
FIG. 6 is a perspective view of the load cell of FIG. 1, taken from below.

FIG. 6, a perspective view of the load cell of FIG. 3, taken from below, shows internal structure of the load cell. Bottom cover plate 24 is removed in this view for the purpose of clarity. This load cell has four web arms 78 connecting outer rim 18 with hub 20, the four arms being located ninety degrees apart fron one another. Elongated apertures 80 are disposed between side walls 84 of the arms. In this embodiment the apertures are shaped in accordance with the method used in manufacturing, that is, three overlapping circular throughholes are bored between each arm as a matter of convenience in obtaining a desired width for the arms. The shape of apertures may be varied, depending on capacity required for the load cell and other factors.

As shown in FIGS. 5 and 6, web portions 78 between openings 80 are of a reduced thickness as compared to rim portion 18 and central region 20. This reduced thickness is selected to allow about 0.010 inch displacement beween center load area 20 and rim 18 with the load cell under a full load. By way of example, with the load cell constructed of 17-4 stainless steel hardened to about Rockwell 45 or so, the thickness of web arms 78 between openings 80 is determined by capacity of the load cell. Further, the distance between openings 80, is also critical in determining capacity of the load cell. As shown in FIG. 3 concave bottom surface 45 that bears against convex surface 44 of the center load area extends below a lower surface of rim 18. Conversely, a top surface 21 of the center load area is recessed by about 0.015 inch or so with respect to an upper surface 19 of rim 20, this upper surface 19 of rim 20 bearing against a supported tank. With this construction, the maximum displacement of rim 18 with respect to center load area 20 is defined by the difference between upper surface 19 of rim 18 and the top surface 21 of the center load area, which as stated is about 0.015 inch or so. While the thickness of webs 78 is selected such that under a full load the maximum anticipated deflection is 0.010 inch or so, the extra clearance of 0.005 inch provides an overload capacity. In one or more different embodiments, the top surface of the rim and center region of the load cell may be constructed with no difference in elevation, and a shim located on upper surface 19 of rim 20. The thickness of the shim may be varied to set maximum weight limits and safety factors.

In order to develop an electrical signal indicative of weight of a tank and its load, a pair of strain gages 82, 83 (FIGS. 7 and 8) are rigidly mounted, as by a bonding agent, to a side wall 84 of each of openings 80. These strain gages are commercially available from sources such as TRANSCELL, of Chicago, Ill. The same type of strain gage is used on opposite sides of each of openings 80. These strain gages (83, FIG. 9) are constructed on a thin, flexible insulative substrate as a continuous, looped run 86 of material similar to the conductive metal on a circuit board, with the looped runs being inclined to the right. Wiring from each strain gage is routed around central area 20 and through an opening 54 which communicates with circuit board for enabling connection of the strain gages in a bridge configuration and for supporting calibration and compensation resistors.

Figures 7, 9:
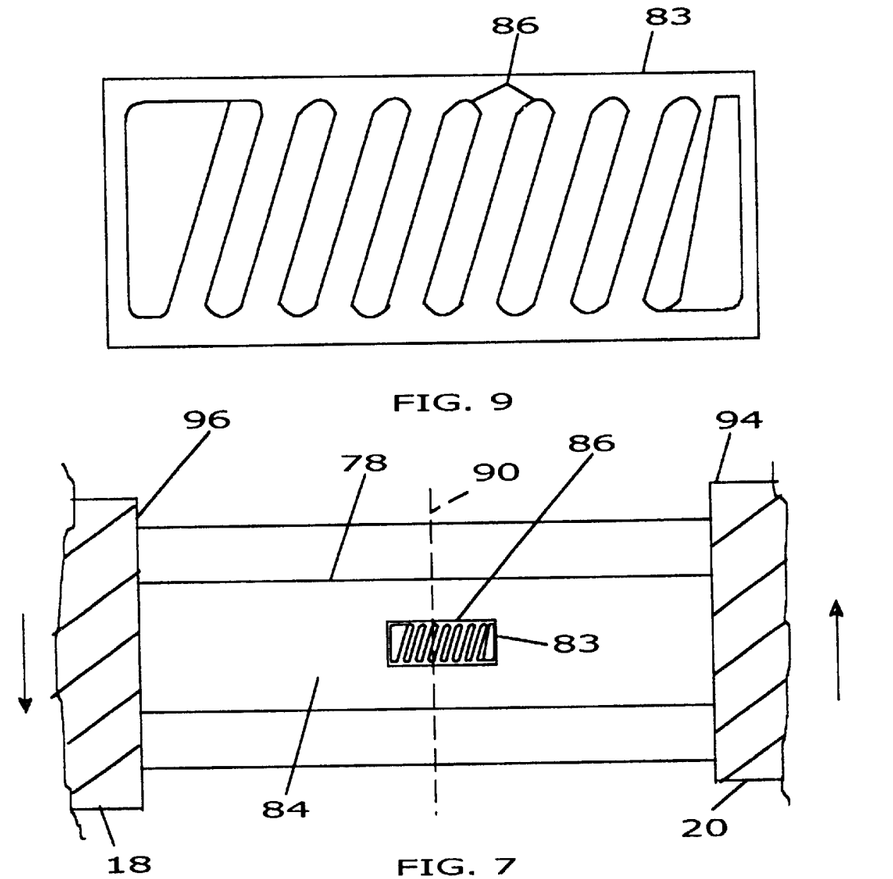
FIG. 7 is a view of a bore of the load cell containing a strain gage wherein slanted leads of the strain gage are put under tension when the load cell is loaded.
FIG. 9 is an enlarged front view of a strain gage used in the present invention.
Figure 8:
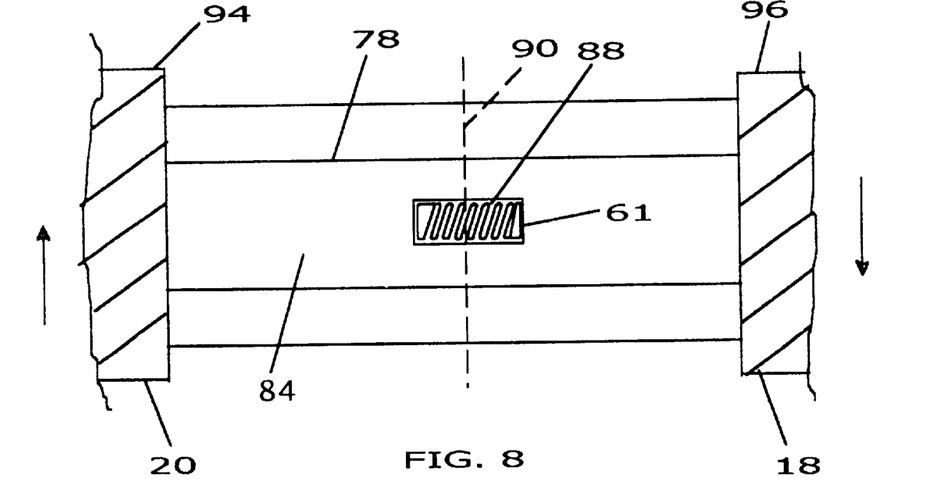
FIG. 8 is a view of a bore of the load cell containing a strain gage wherein slanted leads of the strain gage are compressed when the strain gage is loaded.

As shown in FIGS. 6, 7 and 8, strain gages designated 82 are mounted to side walls 84 of bores 80 such that they face in a clockwise direction around load cell 12, while strain gages designated 83 are mounted in bores 80 so that they face counterclockwise around the load cell. With this mounting, as the web is deformed under a load (indicated by arrows in FIGS. 7 and 8), the slanted runs 86 of strain gages 83 will be slightly stretched, lengthening these runs and causing a corresponding slight increase of impedance or resistance while the slanted runs 88 of strain gages 82 will become slightly compressed, causing a corresponding decrease in impedance or resistance. Significantly, these strain gages are each mounted centered on a vertical line 90 (dashed lines in FIGS. 7 and 8) parallel to the axis of each bore and perpendicular to a line 91 (dashed lines in FIG. 6) defining a shortest distance between two adjacent openings 80. This line 90 generally defines a vertical region of the arms 78 about which maximum flexure of the webs in opposite directions under load occurs. While a pair of strain gages are shown for each of openings 80, in another embodiment only one strain gage may be provided for each opening, with the single gage in each opening alternating in the direction it faces between adjacent openings.

In manufacturing of load cells for use in this invention, necessary cavities and apertures may be obtained by removing metal from a solid block by means such as machining, with one end plate (22 in FIG. 3) kept intact and integral with surfaces of the hub and rim. Access for installation of strain gages and for removal of metal as required is preferably provided by leaving bottom plate 24 off until internal work is completed after which this plate is connected by welding. Locating the welded plate at the bottom of the load cell decreases any possibility of pin hole leaks occurring at the top surface upon exposure to a wet environment.

Figure 10:
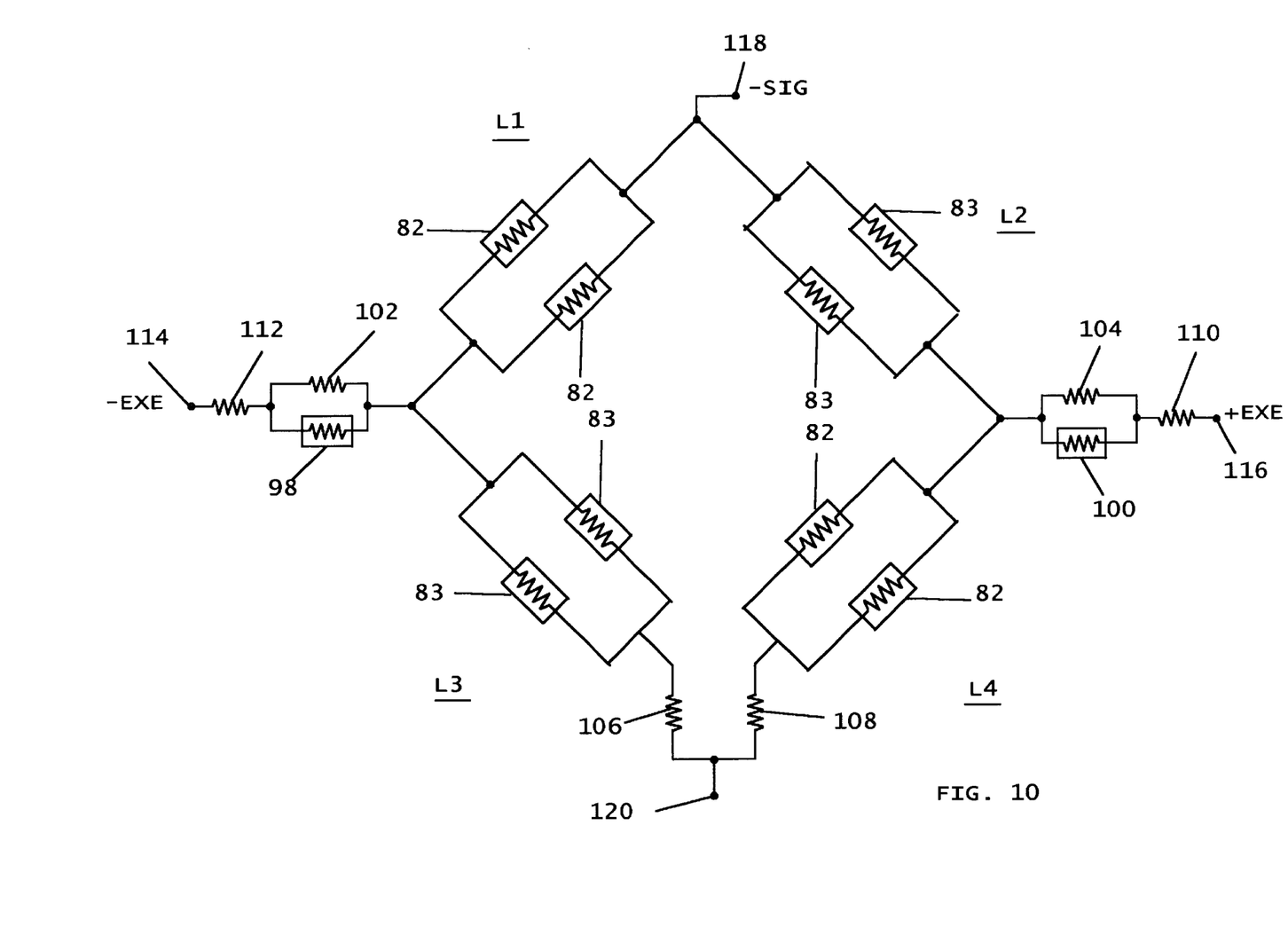
FIG. 10 is an electrical schematic of the load cell.

Referring now to FIG. 10 an electrical schematic of wiring of the strain gages and associated components is shown. Here, it is seen that the eight strain gages of the load cell are wired together in a bridge configuration wherein each leg of the bridge is formed by two of either gages 82, 83. As shown, the strain gages of each leg are connected in parallel to form the leg of the bridge. With this configuration, minor variations of resistance in each strain gage are minimized.

In order to compensate for changes in elasticity of the material the load cell is constructed of, with changes of temperature, modulus resistors 98 and 100 are provided in parallel with shunt resistors 102 and 104, respectively, these modulus resistors serving to assist in maintaining a close linear output of the bridge circuit by altering their resistance directly with temperature of the load cell. Thus, these modulus resistors reduce an output signal of the load cell in an inverse relationship with temperature. Here, as temperature increases, webs 78 flex more with increasing temperature, causing the bridge circuit to develop a higher output for the same load at a cooler temperature. In order to compensate for this temperature-related nonlinear influence, impedance of the modulus resistors increases proportionally with temperature, with the degree of increase of impedance of the modulus resistors selected to match the increase of elasticity of the load cell. Such increase in impedance of the modulus resistors reduces output of the bridge circuit.

Another temperature compensating resistor 106 is provided in parallel with a balance resistor 108, this temperature compensating resistor selected to vary inversely with temperature. In this application, as temperature of the load cell increases, impedance of electrical components of the bridge circuit increases, causing output therefrom to become reduced with increasing temperature. In order to compensate for this temperature related nonlinearity, temperature compensating resistor 106 is selected so that its impedance decreases with temperature so as to closely counteract the increase in impedance of the other electrical components of the bridge.

For a final calibration, a balance resistor 108 is provided in a divider circuit with temperature compensating resistor 106, and calibration resistors 110 and 112 are connected in series with modulus resistors and shunt resistors 98, 100, 102 and 104 respectively. Here, a constant excitation voltage, such as a voltage between 10–15 volts, is applied between terminals 114 and 116 and the voltage at terminals 118 and 120 observed while temperature of the load cell is varied. If the output across terminals 118 and 120 increases with temperature, then temperature compensation resistor 106 is connected to the L3 side of the bridge as shown. Conversely, if the output at terminals 118 and 120 decreases with an increase in temperature, then temperature compensating resistor 106 is connected to the L4 side of the bridge circuit. A value of balance resistor 108 is selected so as to balance the output of the bridge circuit to a null output with no load on the load cell, and the balance resistor coupled in the divider circuit. Values of calibration resistors 110 and 112 are selected so as to provide an output of about 30 millivolts with the load cell fully loaded at an excitation voltage of 10 volts.

Utilizing the wiring configuration as described, and with no unbalance in the bridge, corresponding to an unloaded state of the load cell, current flow through legs L1 and L2 is exactly the same as current flow through legs L3 and L4, resulting in no signal output at terminals 118, 120. When the load cell is loaded, strain gages 82 are lowered in impedance while strain gages 83 are increased in impedance, providing an analog signal output between terminals 118 and 120 which varies directly with the load.

While the invention is described above in terms of specific embodiments, it is not to be understood as so limited, but is limited only as indicated by the appended claims.

What is claimed is:

1. A tank weighing assembly comprising a load cell, a base plate and mounting members yieldably connecting said load cell to said base plate;

said load cell comprising an outer ring portionhaving an upper surface adapted to come into contact with load bearing members supporting a tank, a central hub having a bottom contact surface and web means connecting said ring to said hub, said web means undergoing deflection when weight is applied to said upper ring portion while said lower surface of said hub is supported, said load cell further including means for measuring said deflection and providing a signal indicative of an amount of the said weight, said load cell having defined therein an axially extending bolt-receiving aperature;

said mounting members including a pair of mating arcuate contact surfaces, one arcuate surface comprising said bottom contact surface of said hub and the other mating surface comprising an upward protrusion at a central location of said base plate and an axially extending bolt securing said load cell to said base plate;

said bolt having a countersunk head and a body of uniform diameter below a countersunk portion thereof, said countersunk portion defining a first prescribed angle with respect to vertical;

said aperture through said load cell defined by wall members generally conforming to said bolt, except that a second prescribed angle defined in a wall portion adjacent to countersunk portion of said bolt has a value slightly differing from said first prescribed angle and said aperture is sized to provide a gap between said bolt and said wall.

2. The assembly as defined in claim 1 wherein said upward protrusion comprises a washer disposed between said base plate and said hub.

3. The assembly as defined in claim 2 wherein said hub has a downward projecting portion at an axial location and said projecting portion has a concave contacting surface and said washer has a convex contacting surface.

4. The assembly as defined in claim 1 wherein said first prescribed angle is 45 to 50 degrees.

5. The assembly as defined in claim 2 wherein said second prescribed angle 2 to 5 degrees larger than said first prescribed angle.

6. The assembly as defined in claim 1 wherein said gap between said bolt and an adjacent wall of said load cell is from ¼ to ⅜ inch.

7. The assembly as defined in claim 2 wherein said washer has an axial aperture providing a gap of ¼ inch between said bolt and a wall of said washer.

8. The assembly as defined in claim 1 wherein said bolt head has a first portion parallel to an axis of the bolt and extending down to a junction with an upper end of said countersunk portion.

9. A heavy object weighing assembly comprising a load cell, a base plate and mounting members yieldably connecting said load cell to said base plate;

said load cell comprising an outer ring portion having an upper surface adapted to come into contact with load bearing members supporting said object, a central hub having a bottom contact surface and web means connecting said ring to said hub, said web means undergoing deflection when weight is applied to said upper ring portion while said lower surface of said hub is supported, said load cell further including means for measuring said deflection and providing a signal indicative of an amount of the said weight, said load cell having defined therein an axially extending bolt-receiving aperature;

said mounting members including a pair of mating arcuate contact surfaces, one arcuate surface comprising said bottom contact surface of said hub and the other mating surface comprising an upward protrusion at a central location of said base plate and an axially extending bolt securing said load cell to said base plate;

said bolt having a countersunk head and a body of uniform diameter below a countersunk portion thereof, said countersunk portion defining a first prescribed angle with respect to vertical;

said aperture through said load cell defined by wall members generally conforming to said bolt, except that a second prescribed angle defined in a wall portion adjacent to countersunk portion of said bolt has a value slightly differing from said first prescribed angle and said aperture is sized to provide a gap between said bolt and said wall.

* * * * *